United States Patent
Yamashita et al.

(10) Patent No.: US 9,976,510 B2
(45) Date of Patent: May 22, 2018

(54) FUEL INJECTION CONTROL APPARATUS

(71) Applicant: HONDA MOTOR CO., LTD., Tokyo (JP)

(72) Inventors: Shohei Yamashita, Wako (JP); Tadashi Kurotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 15/151,496

(22) Filed: May 11, 2016

(65) Prior Publication Data

US 2016/0377013 A1    Dec. 29, 2016

(30) Foreign Application Priority Data

Jun. 24, 2015    (JP) .................................. 2015-126177

(51) Int. Cl.
*F02D 13/00*    (2006.01)
*F02D 41/30*    (2006.01)
(Continued)

(52) U.S. Cl.
CPC ..... *F02D 41/3094* (2013.01); *F02D 13/0269* (2013.01); *F02D 19/0655* (2013.01);
(Continued)

(58) Field of Classification Search
CPC ........................... F02D 13/0269; Y02T 10/142
(Continued)

(56) References Cited

U.S. PATENT DOCUMENTS 6,058,348 A * 5/2000 Ohyama ............. F01L 13/0036
                                                    123/294
7,073,493 B2 * 7/2006 Nakasaka ............... F01L 1/053
                                                    123/305
(Continued)

FOREIGN PATENT DOCUMENTS

JP    2014-206055    10/2014
JP    2015-004342    1/2015
(Continued)

OTHER PUBLICATIONS

Japanese Office Action for corresponding JP Application No. 2015-126177, dated Dec. 6, 2016 (w/ English machine translation).

*Primary Examiner* — Erick Solis
(74) *Attorney, Agent, or Firm* — Mori & Ward, LLP

(57) ABSTRACT

A fuel injection control apparatus for an internal combustion engine having cylinders each of which includes a fuel injection valve and an intake valve, includes an intake valve controller, a parameter acquiring device, and an injection quantity correcting device. The intake valve controller performs an effective-compression-ratio reducing operation. The parameter acquiring device acquires a correction parameter including at least one of a rotational speed of the internal combustion engine, the valve closing timing of the intake valve, and an intake parameter indicating an intake fresh air amount flowing into the cylinders through an intake system. The injection quantity correcting device corrects a fuel injection quantity for the fuel injection valve in accordance with the acquired correction parameter to suppress variations among air/fuel ratios of air fuel mixtures in the cylinders while the intake valve controller performs the effective-compression-ratio reducing operation.

13 Claims, 8 Drawing Sheets

(51) Int. Cl.
  *F02D 13/02* (2006.01)
  *F02D 19/06* (2006.01)
  *F02D 41/00* (2006.01)
  *F02D 41/14* (2006.01)
  *F02D 41/32* (2006.01)
  *F02D 41/40* (2006.01)

(52) U.S. Cl.
  CPC ..... *F02D 19/0692* (2013.01); *F02D 41/0025* (2013.01); *F02D 41/0085* (2013.01); *F02D 41/1454* (2013.01); *F02D 41/32* (2013.01); *F02D 41/40* (2013.01); *F02D 2041/001* (2013.01); *Y02T 10/142* (2013.01); *Y02T 10/36* (2013.01); *Y02T 10/44* (2013.01)

(58) Field of Classification Search
  USPC ........... 701/104; 123/90.15–90.18, 316, 478, 123/480, 532, 673
  See application file for complete search history.

(56) References Cited

U.S. PATENT DOCUMENTS

| | | | |
|---|---|---|---|
| 8,538,659 B2* | 9/2013 | Wang | F02D 13/0219 123/673 |
| 2004/0267431 A1* | 12/2004 | Pierpont | F02D 13/0226 701/104 |
| 2014/0032080 A1* | 1/2014 | Gehrke | F02D 41/402 701/104 |
| 2014/0032081 A1* | 1/2014 | Willi | F02B 23/0672 701/104 |
| 2015/0233308 A1* | 8/2015 | Kidooka | F02D 13/06 701/104 |
| 2016/0146139 A1* | 5/2016 | Jankovic | F02D 41/0087 701/104 |

FOREIGN PATENT DOCUMENTS

| | | |
|---|---|---|
| JP | 2015-048790 | 3/2015 |
| WO | WO 2010/079623 | 7/2010 |

\* cited by examiner

FUEL INJECTION CONTROL APPARATUS

CROSS-REFERENCE TO RELATED APPLICATIONS

The present application claims priority under 35 U.S.C. § 119 to Japanese Patent Application No. 2015-126177, filed Jun. 24, 2015, entitled "Fuel Injection Control Apparatus of Internal Combustion Engine." The contents of this application are incorporated herein by reference in their entirety.

BACKGROUND

1. Field

The present disclosure relates to a fuel injection control apparatus.

2. Description of the Related Art

As a fuel injection control apparatus of this type, there has been heretofore known one disclosed in Japanese Unexamined Patent Application Publication No. 2015-4342, for example. In an internal combustion engine in which the fuel injection control apparatus is used, the effective-compression-ratio reducing operation is performed by Miller cycle operation to set the valve closing timing of the intake valve at a timing within the compression stroke. In this fuel injection control apparatus of the related art, when the effective-compression-ratio reducing operation is being performed, and the internal combustion engine is in a transient operation, the control of the valve closing timing of the intake valve described above causes fuel blown back from the inside of the cylinders to the intake ports to flow into the cylinders. This may shift an air/fuel ratio of the air fuel mixture from a desired value, and in order to prevent this situation, a fuel injection quantity of the fuel injection valve provided to each cylinder is controlled as follows.

That is, a basic injection quantity is calculated in accordance with the operating state of the internal combustion engine, and a quantity of the fuel blown back from the cylinder to the intake port (hereinafter referred to as a "blown-back fuel quantity") is also calculated based on the fuel injection timing of the fuel injection valve, the valve closing timing of the intake valve, the pressure in the intake manifold, and other parameters. In addition, the final fuel injection quantity is calculated by subtracting the calculated blown-back fuel quantity of the last combustion cycle from the basic injection quantity and adding the blown-back fuel quantity of the current combustion cycle to the basic injection quantity, and the fuel injection quantity of the fuel injection valve is controlled so as to achieve this calculated final fuel injection quantity. The control of the fuel injection quantity in accordance with the blown-back fuel quantity is uniformly performed for each of the multiple fuel injection valves.

While the effective-compression-ratio reducing operation is performed, a part of air fuel mixture is blown back from a cylinder in a compression stroke to the intake manifold. In an internal combustion engine having multiple cylinders, since, when one of the multiple cylinders is in a compression stroke, another one of the multiple cylinders is in an intake stroke, a part of the air fuel mixture blown back from the cylinder in the compression stroke (hereinafter referred to a "blown-back air fuel mixture") flows into the other cylinder in the intake stroke through the intake manifold, and the remains of the blown-back air fuel mixture tend to stay in the intake manifold. The air fuel mixture staying (hereinafter referred to as the "residual air fuel mixture") flows into another cylinder in the next and subsequent strokes, which is in an intake stroke at that time. In addition, fresh air also flows into a cylinder in an intake stroke from the intake main passage connected to the intake manifold. As describe above, while the effective-compression-ratio reducing operation is performed, fresh air, the blown-back air fuel mixture, and the residual air fuel mixture flow into a cylinder in an intake stroke.

In this case, since the intake main passage introducing the fresh air is connected to the cylinders via the intake manifold, a cylinder farther from the intake main passage among the multiple cylinders receives less inflow of fresh air and more inflow of blown-back air fuel mixture and residual air fuel mixture. As a result, even if the same quantity of fuel is supplied to each of the multiple cylinders, the air/fuel ratio of the burned air fuel mixture in a cylinder farther from the intake main passage is richer than in other cylinders. Accordingly, while the effective-compression-ratio reducing operation is performed, the air/fuel ratios of the air fuel mixture in the multiple cylinders are not equal to each other and may vary.

SUMMARY

According to one aspect of the present invention, a fuel injection control apparatus of an internal combustion engine including a plurality of cylinders, a fuel injection valve and an intake valve, the fuel injection valve and the intake valve being provided to each of the cylinders, in which an effective-compression-ratio reducing operation is performed to reduce an effective-compression-ratio by setting a valve closing timing of the intake valve at a timing within a compression stroke, the fuel injection control apparatus includes a parameter acquiring device and an injection quantity correcting device. The parameter acquiring device acquires a correction parameter including at least one of a rotational speed of the internal combustion engine, the valve closing timing of the intake valve, and an intake parameter indicating an intake air amount which is an amount of fresh air flowing through an intake system of the internal combustion engine. The injection quantity correcting device, while the effective-compression-ratio reducing operation is performed, makes a correction on a fuel injection quantity of the fuel injection valve for each cylinder in accordance with the acquired correction parameter to suppress variations in an air/fuel ratio of air fuel mixture among the cylinders, the variations being caused by the air fuel mixture which is blown back to the intake system from a cylinder in a compression stroke among the cylinders and flows into another cylinder in an intake stroke.

According to another aspect of the present invention, a fuel injection control apparatus for an internal combustion engine having cylinders each of which includes a fuel injection valve and an intake valve, includes an intake valve controller, a parameter acquiring device, and an injection quantity correcting device. The intake valve controller performs an effective-compression-ratio reducing operation in which a valve closing timing of the intake valve is controlled to be at a timing in a compression stroke to reduce an effective-compression-ratio. The parameter acquiring device acquires a correction parameter including at least one of a rotational speed of the internal combustion engine, the valve closing timing of the intake valve, and an intake parameter indicating an intake fresh air amount flowing into the cylinders through an intake system. The injection quantity correcting device corrects a fuel injection quantity for the fuel injection valve in accordance with the acquired correction parameter to suppress variations among air/fuel ratios of air fuel mixtures in the cylinders while the intake valve controller performs the effective-compression-ratio reducing operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
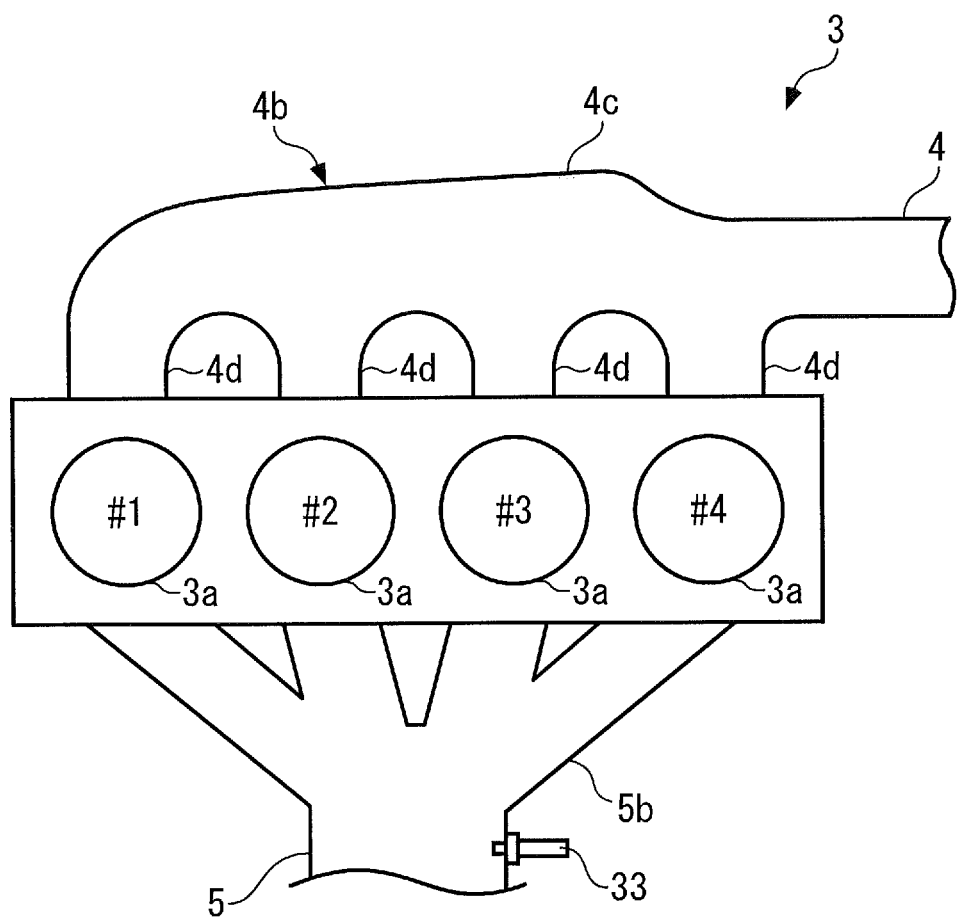
FIG. 1 is a plan view schematically illustrating an internal combustion engine to which a fuel injection control apparatus according to an embodiment of the present disclosure is applied.

The embodiments will now be described with reference to the accompanying drawings, wherein like reference numerals designate corresponding or identical elements throughout the various drawings.

Figure 2:
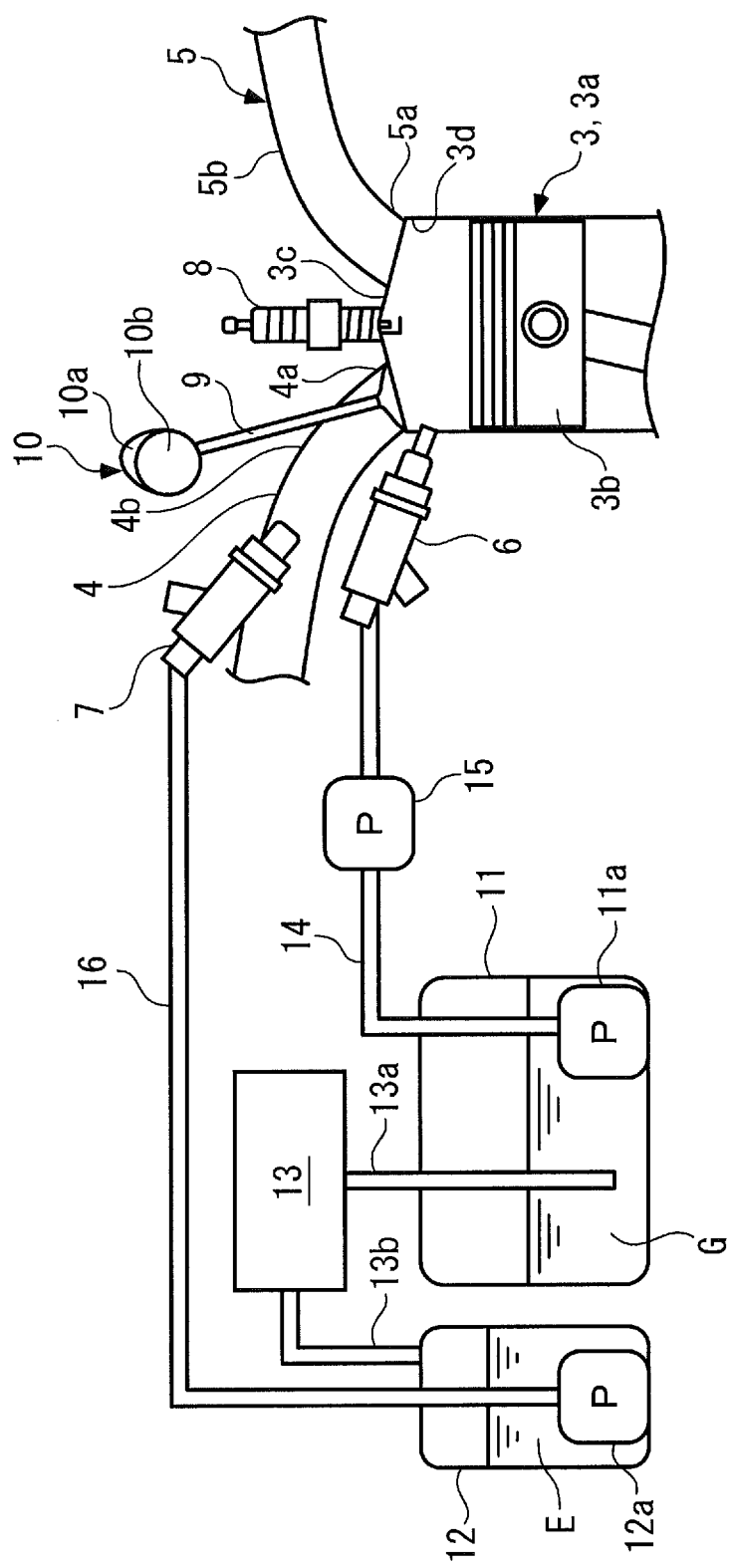
FIG. 2 is a side view schematically illustrating the internal combustion engine and other related parts.

An embodiment of the present disclosure will be hereinafter described in detail with reference to the drawings. FIGS. 1 and 2 illustrate an internal combustion engine (hereinafter referred to as an "engine") 3 to which a fuel injection control apparatus 1 according to the embodiment is applied. The engine 3 is mounted on a vehicle (not illustrated) and uses gasoline G as low octane fuel and ethanol E as high octane fuel in combination. The gasoline G, which is commercially available and contains about 10% of an ethanol component, is stored in a first fuel tank 11. The ethanol E, which contains about 60% of an ethanol component and has a higher octane number than that of the gasoline G, is stored in a second fuel tank 12. Low pressure pumps 11a and 12a are provided inside the first fuel tank 11 and the second fuel tank 12, respectively.

Figure 3:
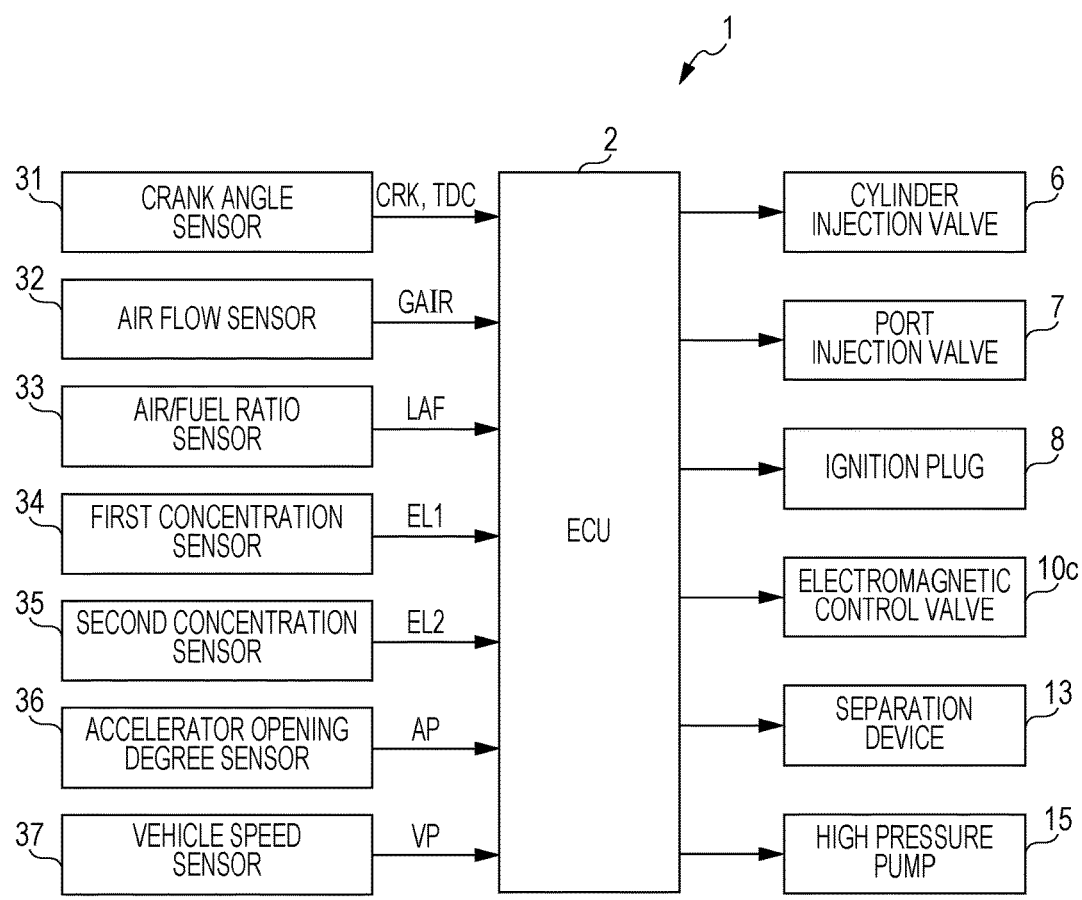
FIG. 3 is a block diagram illustrating an ECU and the other parts in a control unit.

In the present embodiment, the ethanol E is produced from the gasoline G by a separation device 13. This separation device 13 produces the ethanol E by separating the ethanol component from the gasoline G supplied from the first fuel tank 11 through a passage 13a, and also supplies the produced ethanol E to the second fuel tank 12 through a passage 13b. Operation of the separation device 13 is controlled by an ECU 2 described later of the fuel injection control apparatus 1 (see FIG. 3).

The engine 3 includes a #1 cylinder 3a, a #2 cylinder 3a, a #3 cylinder 3a, and a #4 cylinder 3a, each of the cylinders 3a having a combustion chamber 3d formed between a piston 3b and a cylinder head 3c thereof. In the following description, only one reference numeral will be representatively mentioned with respect to multiple constituent elements for convenience. An intake main passage 4 is connected to the combustion chamber 3d through an intake port 4a and an intake manifold 4b, and an exhaust main passage 5 is also connected to the combustion chamber 3d through an exhaust port 5a and an exhaust manifold 5b.

The intake manifold 4b has a chamber portion 4c and four branch passages 4d integrally formed therewith. The chamber portion 4c extends in the direction of a row of the #1 to #4 cylinders 3a and is connected to the intake main passage 4. Each of the branch passages 4d branches off from the chamber portion 4c, extends to a cylinder 3a side, and is connected to a corresponding one of the #1 to #4 cylinders 3a. The length of each branch passage 4d is designed to be relatively short so that the engine 3 is small in size as a whole. Note that cylinder injection valves 6 and port injection valves 7 are not illustrated in FIG. 1, and reference numerals for the chamber portion 4c and the branch passages 4d are not illustrated in FIG. 2, for convenience.

For each of the cylinders 3a, a cylinder injection valve 6 is provided at a side of the cylinder head 3c, and a port injection valve 7 is provided to the branch passage 4d of the intake manifold 4b. Note that, in FIG. 1, the cylinder injection valves 6 and the port injection valves 7 are not illustrated for the sake of convenience of the illustration. In addition, the cylinder head 3c of each cylinder 3a is provided with an ignition plug 8 to ignite air fuel mixture produced from fuel and fresh air in the combustion chamber 3d.

Each of the cylinder injection valve 6 and the port injection valve 7 is a typical valve having a solenoid, a needle valve (neither of them is illustrated), and other relevant components. The cylinder injection valve 6 is arranged such that a tip thereof having a nozzle (not illustrated) faces the combustion chamber 3d, and is connected to the first fuel tank 11 through a gasoline supply passage 14 and a high pressure pump 15 provided in the middle of the gasoline supply passage 14. The port injection valve 7 is arranged such that a tip thereof having a nozzle (not illustrated) faces the intake port 4a, and is connected to the second fuel tank 12 through an ethanol supply passage 16.

With the configuration described above, the gasoline G is supplied from the first fuel tank 11 through the gasoline supply passage 14 to the cylinder injection valve 6 after being pressurized by the high pressure pump 15, and injected from the cylinder injection valve 6 directly to the combustion chamber 3d. The pressure of the gasoline G when supplied to the cylinder injection valve 6 is changed by the ECU 2 controlling the operation of the high pressure pump 15. The ethanol E is supplied from the second fuel tank 12 through the ethanol supply passage 16 to the port injection valve 7 and injected from the port injection valve 7 to the intake port 4a.

The engine 3 is also provide with an intake valve 9 to open/close the intake port 4a for each cylinder 3a, and a valve operating mechanism 10 to drive the intake valve 9. The valve operating mechanism 10 is a typical mechanism and includes a valve spring biasing the intake valve 9 to the closed state, a rocker arm contacting the intake valve 9 (neither of them is illustrated), an intake cam 10a driving the intake valve 9 via the rocker arm, and an intake cam shaft 10*b* integrally provided with the intake cam 10*a*, and a variable cam phaser (not illustrated). The intake cam shaft 10*b* is connected to a crankshaft (not illustrated) of the engine 3, and makes one rotation for every two rotations of the crankshaft. Along with the rotation of the crankshaft, the intake valve 9 is driven by the intake cam 10*a* and the rocker arm, and is basically kept in a valve open state during an intake stroke of the corresponding cylinder 3*a*, and in a valve closed state during any stroke other than the intake stroke.

The variable cam phaser, provided to the intake cam shaft 10*b*, is operated by hydraulic pressure supplied by a hydraulic pump (not illustrated) and changes the phase of the intake cam shaft 10*b* (hereinafter referred to as the "cam phase") continuously with respect to the crankshaft. With this operation, all the opening/closing timings of the intake valves 9 corresponding to the #1 to #4 cylinders 3*a* are changed all together, which changes the effective-compression-ratio of the engine 3. The degree of change of the cam phase by the variable cam phaser varies according to the hydraulic pressure supplied. The variable cam phaser is provided with an electromagnetic control valve 10*c* (see FIG. 3), which changes the hydraulic pressure supplied to the variable cam phaser by being driven by a control signal received from the ECU 2.

In addition, the engine 3 is provided with a forced induction device that is a turbocharger (not illustrated), operation of which is controlled by the ECU 2.

Moreover, a crank angle sensor 31 is provided to the engine 3, an air flow sensor 32 is provided at the intake main passage 4, and an air/fuel ratio sensor 33 is provided to the exhaust main passage 5 near a connecting portion to the exhaust manifold 5*b* (see FIG. 1). The crank angle sensor 31 outputs a CRK signal and a TDC signal, which are pulse signals, to the ECU 2 along with the rotation of the crankshaft (see FIG. 3). The CRK signal is output for every predetermined rotation angle (for example, 1°) of the crankshaft. The ECU 2 calculates the rotational speed of the engine 3 (hereinafter referred to as the "engine rotational speed") NE based on the CRK signal. The TDC signal is a signal indicating that the piston 3*b* is positioned near the top dead center, at which an intake stroke starts, in any one of the #1 to #4 cylinders 3*a*, and is outputted at every 180-degree rotation of the crankshaft because the present embodiment has four cylinders 3*a*.

The aforementioned air flow sensor 32 detects an amount of fresh air (hereinafter referred to as a "fresh air flow amount") GAIR flowing through the intake main passage 4, and outputs the detection signal to the ECU 2. The air/fuel ratio sensor 33 detects an air/fuel ratio of air fuel mixture burned in the combustion chamber 3*d* as a detected air/fuel ratio LAF, and outputs the detection signal to the ECU 2. In this case, since the exhaust main passage 5 provided with the air/fuel ratio sensor 33 is located downstream from the exhaust manifold 5*b*, exhaust gas produced in each of the #1 to #4 cylinders 3*a* is mixed together, and the detected air/fuel ratio LAF is detected in the thus-mixed exhaust gas.

Moreover, the engine 3 is provided with a cylinder discrimination sensor (not illustrated), and the cylinder discrimination sensor outputs a cylinder discrimination signal, which is a pulse signal to discriminate each cylinder 3*a*, to the ECU. The ECU 2 calculates an actual rotation angle position of the crankshaft for each cylinder 3*a* based on this cylinder discrimination signal and the above-described CRK signal and TDC signal.

The first and second fuel tanks 11 and 12 are provided with a first concentration sensor 34 and a second concentration sensor 35, respectively. The first concentration sensor 34 detects a concentration of the ethanol component (hereinafter referred to as a "first ethanol concentration") EL1 contained in the gasoline G stored in the first fuel tank 11, and outputs the detection signal to the ECU 2 (see FIG. 3). The second concentration sensor 35 detects a concentration of the ethanol component (hereinafter referred to as a "second ethanol concentration") EL2 contained in the ethanol E stored in the second fuel tank 12, and outputs the detection signal to the ECU 2.

Moreover, a detection signal indicating an operation amount (hereinafter referred to as an "accelerator opening degree") AP of an accelerator pedal (not illustrated) of the vehicle is output from an accelerator opening degree sensor 36 to the ECU 2 and a detection signal indicating a vehicle speed VP of the vehicle is output from a vehicle speed sensor 37 to the ECU 2.

The ECU 2 includes a microcomputer having a CPU, a RAM, a ROM, an I/O interface (none of them is illustrated) and other parts. The ECU 2, in response to receiving the detection signals from the aforementioned various sensors 31 to 37, controls the injection operation of the cylinder injection valve 6 and the port injection valve 7 and also controls the ignition operation of the ignition plug 8 and an opening degree of the electromagnetic control valve 10*c* according to a control program stored in the ROM. Note that, in FIG. 3, one of the cylinder injection valves 6, one of the port injection valves 7, and one of the ignition plugs 8 are illustrated for convenience.

To be more specific, the ECU 2 controls the opening degree of the electromagnetic control valve 10*c* such that the valve closing timing of the intake valve 9 is equal to a target valve closing timing IVCOBJ described later. From this operation, when the engine 3 is within a predetermined load range, the valve closing timing of the intake valve 9 is controlled to be at a predetermined timing within the compression stroke of the engine 3. This causes a part of the air fuel mixture which has once flowed in the cylinder 3*a* to be blown back to the intake manifold 4*b* through the intake port 4*a*, which reduces the effective-compression-ratio of the engine 3 compared to the expansion ratio, thereby improving the thermal efficiency of the engine 3 (Atkinson cycle). Hereinafter, the operation to reduce the effective-compression-ratio by setting the valve closing timing of the intake valve 9 at a timing within the compression stroke is referred to as the "effective-compression-ratio reducing operation".

As described above with reference to FIG. 1, the length of the branch passages 4*d* of the intake manifold 4*b* is short in the engine 3. Accordingly, while the effective-compression-ratio reducing operation is performed, the air fuel mixture (hereinafter referred to as the "blown-back air fuel mixture") blown back from a cylinder 3*a* in a compression stroke to the branch passage 4*d* of the intake manifold 4*b* corresponding to the cylinder 3*a* tends to flow into another cylinder 3*a* in an intake stroke through the chamber portion 4*c* and the branch passage 4*d* corresponding to the other cylinder 3*a*. In this case, the part of the blown-back air fuel mixture flows into the other cylinder 3*a*, and the remains of the blown-back air fuel mixture stay in the chamber portion 4*c* or near the areas. In the next and subsequent strokes, the air fuel mixture staying (hereinafter referred to as the "residual air fuel mixture") is taken into a cylinder 3*a* which is in an intake stroke at that time.

As is apparent from the above, while the effective-compression-ratio reducing operation is performed, in addition to fresh air introduced through the intake main passage 4, the blown-back air fuel mixture and the residual air fuel mixture described above flow into each cylinder 3a. In this case, as for the #1 to #4 cylinders 3a, the ratio of the blown-back air fuel mixture and the residual air fuel mixture contained in the air fuel mixture flowing into each cylinder 3a (hereinafter collectively referred to as the "inflow blown-back air fuel mixture ratio") is the highest in the #1 cylinder 3a and becomes lower in the order of the #2 to #4 cylinders 3a (the inflow blown-back air fuel mixture ratio: the #1 cylinder 3a>the #2 cylinder 3a>the #3 cylinder 3a>the #4 cylinder 3a). Meanwhile, the ratio of the fresh air contained in the air fuel mixture flowing into each cylinder 3a (hereinafter referred to as the "inflow fresh air ratio") is the lowest in the #1 cylinder 3a, and becomes higher in the order of the #2 to #4 cylinders 3a (the inflow fresh air ratio: the #1 cylinder 3a<the #2 cylinder 3a<the #3 cylinder 3a<the #4 cylinder 3a). The reason is as follows.

As is well known, the ignition of each ignition plugs 8 is performed in the order of the #1 cylinder 3a, the #3 cylinder 3a, the #4 cylinder 3a, and the #2 cylinder 3a in the engine 3, while shifted by one stroke each time. When the #1 cylinder 3a is in an intake stroke, the #2 cylinder 3a is in a compression stroke, and the #4 cylinder 3a is in an expansion stroke, which means that the last stroke of the #4 cylinder 3a is a compression stroke. In addition, since the #1 cylinder 3a is positioned at the side opposite the intake main passage 4 which introduces the fresh air and the #1 cylinder 3a is the farthest from the intake main passage 4 among the #1 to #4 cylinders 3a, a pressure of the fresh air in the intake main passage 4 applied to the branch passage 4d corresponding to the #1 cylinder 3a is the lowest.

Accordingly, among the #1 to #4 cylinders 3a, the inflow blown-back air fuel mixture ratio of the #1 cylinder 3a is the highest, and the inflow fresh air ratio of the #1 cylinder 3a is the lowest. As a result, the air/fuel ratio of the air fuel mixture burned in the #1 cylinder 3a varies to the rich side to a large extent and is richer than the air/fuel ratio of the air fuel mixture burned in each of the #2 to #4 cylinders 3a, even though the fuel injection quantity for each of the #1 to #4 cylinders 3a is the same.

When the #2 cylinder 3a is in an intake stroke, the #4 cylinder 3a is in a compression stroke, and the #3 cylinder 3a is in an expansion stroke, which means that the last stroke of the #3 cylinder 3a is a compression stroke. Since the #2 cylinder 3a is closer than the #1 cylinder 3a to, and farther than the #3 and #4 cylinders 3a from, the intake main passage 4, a pressure of the fresh air in the intake main passage 4 applied to the branch passage 4d corresponding to the #2 cylinder 3a is higher than that for the #1 cylinder 3a, and lower than those for the #3 and #4 cylinders 3a.

Accordingly, the inflow blown-back air fuel mixture ratio of the #2 cylinder 3a is lower than that of the #1 cylinder 3a and higher than those of the #3 and #4 cylinders 3a, and the inflow fresh air ratio of the #2 cylinder 3a is higher than that of the #1 cylinder 3a and lower than those of the #3 and #4 cylinders 3a. As a result, the air/fuel ratio of the air fuel mixture burned in the #2 cylinder 3a is leaner than the air/fuel ratio of the air fuel mixture burned in the #1 cylinder 3a and richer than the air/fuel ratio of the air fuel mixture burned in each of the #3 and #4 cylinders 3a, even though the fuel injection quantity for each of the #1 to #4 cylinders 3a is the same.

When the #3 cylinder 3a is in an intake stroke, the #1 cylinder 3a is in a compression stroke, and the #2 cylinder 3a is in an expansion stroke, which means that the last stroke of the #2 cylinder 3a is a compression stroke. Since the #3 cylinder 3a is closer than the #1 and #2 cylinders 3a to, and farther than the #4 cylinder 3a from, the intake main passage 4, a pressure of the fresh air in the intake main passage 4 applied to the branch passage 4d corresponding to the #3 cylinder 3a is higher than those for the #1 and #2 cylinders 3a, and lower than that for the #4 cylinder 3a.

Accordingly, the inflow blown-back air fuel mixture ratio of the #3 cylinder 3a is lower than those of the #1 and #2 cylinders 3a and higher than that of the #4 cylinder 3a, and the inflow fresh air ratio of the #3 cylinder 3a is higher than those of the #1 and #2 cylinders 3a and lower than that of the #4 cylinder 3a. As a result, the air/fuel ratio of the air fuel mixture burned in the #3 cylinder 3a is leaner than the air/fuel ratio of the air fuel mixture burned in each of the #1 and #2 cylinders 3a and richer than the air/fuel ratio of the air fuel mixture burned in the #4 cylinder 3a, even though the fuel injection quantity for each of the #1 to #4 cylinders 3a is the same.

When the #4 cylinder 3a is in an intake stroke, the #3 cylinder 3a is in a compression stroke, and the #1 cylinder 3a is in an expansion stroke, which means that the last stroke of the #1 cylinder 3a is a compression stroke. Since the #4 cylinder 3a is the closest to the intake main passage 4, a pressure of the fresh air in the intake main passage 4 applied to the branch passage 4d corresponding to the #4 cylinder 3a is the highest among the #1 to #4 cylinders 3a. Accordingly, the inflow blown-back air fuel mixture ratio of the #4 cylinder 3a is the lowest among the #1 to #4 cylinders 3a, and the inflow fresh air ratio of the #4 cylinder 3a is the highest among the #1 to #4 cylinders 3a. As a result, the air/fuel ratio of the air fuel mixture burned in the #4 cylinder 3a is leaner than the air/fuel ratio of the air fuel mixture burned in each of the #1 to #3 cylinders 3a, even though the fuel injection quantity for each of the #1 to #4 cylinders 3a is the same.

As described above, the inflow blown-back air fuel mixture ratio and inflow fresh air ratio vary among the #1 to #4 cylinders 3a, and accordingly, the air/fuel ratio of the air fuel mixture burned in each of the #1 to #4 cylinders 3a tends to vary with the relation of the air/fuel ratio of #1 cylinder 3a<the air/fuel ratio of #2 cylinder 3a<the air/fuel ratio of #3 cylinder 3a<the air/fuel ratio of #4 cylinder 3a. In order to suppress variations in the air/fuel ratio among the #1 to #4 cylinders 3a (hereinafter referred to as the "variations in the air/fuel ratio among the cylinders"), the ECU 2 performs fuel injection control processing illustrated in FIG. 4 to control the fuel injection quantity (injection time) of the cylinder injection valve 6 and the port injection valve 7 for each of the cylinders 3a.

This fuel injection control processing is performed repeatedly in synchronization with the generation of the TDC signal. First, at step 1 (illustrated as "S1", the same applies hereafter) in FIG. 4, the cylinder number #i indicating the number of each cylinder 3a is set (i=one of 1 to 4). The cylinder number #i is set to the number of a cylinder 3a corresponding to the TDC signal generated this time based on the cylinder discrimination signal described above, and set in the order of #1→#3→#4→#2 at every execution of this processing. At step 2 and the following steps after step 1, a fuel injection quantity of the cylinder injection valve 6 and the port injection valve 7 corresponding to the cylinder 3a having the set cylinder number #i is controlled, and accordingly the fuel injection quantities for both injection valves 6 and 7 are controlled for each cylinder 3a.

At this step 2, the ECU 2 calculates the target valve closing timing IVCOBJ in accordance with the calculated engine rotational speed NE and a required torque TREQ of the engine 3 by retrieving a predetermined map (not illustrated). This target valve closing timing IVCOBJ is a target value of the valve closing timing of the intake valve 9 and is calculated as a crank angle position (a rotation angle position of the crankshaft with respect to the TDC signal of each cylinder 3a). The target valve closing timing IVCOBJ is basically calculated to be a predetermined timing at an end period of the intake stroke of the engine 3. As described above, however, when the engine 3 is in a predetermined load range, the target valve closing timing IVCOBJ is calculated to be a predetermined timing at a beginning period of the compression stroke of the engine 3 to perform the effective-compression-ratio reducing operation and improve the thermal efficiency of the engine 3 by blowing back the air fuel mixture from the cylinders 3a to the intake manifold 4b.

In addition, upon a control signal based on the target valve closing timing IVCOBJ being inputted to the electromagnetic control valve 10c, the valve closing timing of the intake valve 9 is controlled to be the target valve closing timing IVCOBJ. Note that the required torque TREQ is calculated in accordance with the detected vehicle speed VP and the accelerator opening degree AP by retrieving a predetermined map (not illustrated).

At step 3 following step 2, the ECU 2 calculates (estimates) an intake air amount GACYL#i which is an amount of fresh air flowing into the cylinder 3a having the cylinder number #i in accordance with the engine rotational speed NE and the detected fresh air quantity GAIR by retrieving a predetermined map (not illustrated). The ROM in the ECU 2 stores four maps in total for the #1 to #4 cylinders 3a as the maps described above to calculate the intake air amount GACYL#i.

At step 4 following step 3, the ECU 2 calculates a basic fuel injection quantity QINJB#i for the cylinder 3a having the cylinder number #1 in accordance with the engine rotational speed NE and the required torque TREQ of the engine 3 by retrieving a predetermined map (not illustrated). Then, the ECU 2 calculates a tentative fuel injection quantity QITEM#i for the cylinder 3a having the cylinder number #i by multiplying the calculated basic fuel injection quantity QINJB#i by a correction factor KINJ (step 5). This correction factor KINJ is calculated, for example, such that a detected air/fuel ratio LAF is equal to a predetermined target air/fuel ratio according to a predetermined feedback algorithm.

Next, the ECU 2 calculates a practical valve closing timing IVC for the intake valve 9 based on the target valve closing timing IVCOBJ calculated at step 2 (step 6). Here, the valve closing timing IVC is calculated, for example, as a weighted average of the last value IVCOBJZ and the value before last IVCOBJZZ of the target valve closing timing. The reason why the valve closing timing IVC is thus calculated is that the variable cam phaser of the valve operating mechanism 10 is of a hydraulic type, and the responsiveness thereof is relatively low. Note that since, as described above, the valve closing timings of all the intake valves 9 corresponding to the #1 to #4 cylinders 3a are changed all together by the variable cam phaser, the valve closing timing IVC in this case corresponds to the valve closing timing of the intake valve 9 for the cylinder 3a having the cylinder number #i.

Subsequently, the ECU 2 determines whether or not the engine rotational speed NE is lower than a predetermined rotational speed NEREF (step 7), and also determines whether or not the valve closing timing IVC calculated in the above step 6 is larger than a predetermined value IVCREF (step 8). When one of the answers of steps 7 and 8 is NO (NE≥NEREF or IVC≤IVCREF), the ECU 2 sets the tentative fuel injection quantity QITEM#i calculated in the above step 5, as a total fuel injection quantity QINJT#i for the cylinder 3a having the cylinder number #i (step 9), and proceeds to step 21 in FIG. 5.

On the other hand, when both of the answers of steps 7 and 8 are YES (NE<NEREF and IVC>IVCREF), the ECU 2 corrects the total fuel injection quantity QINJT#i by performing steps 10 and 11 to suppress variations in the air/fuel ratio among the cylinders described earlier (the variations among the cylinders 3a caused by the blown-back air fuel mixture and the residual air fuel mixture flowing into a cylinder 3a in an intake stroke). At this step 10, the ECU 2 calculates a variation correction factor KDIS#i for the cylinder 3a having the cylinder number #i in accordance with the valve closing timing IVC of the intake valve 9, the engine rotational speed NE, and the intake air amount GACYL#i calculated in the above step 3 by retrieving the KDIS#1 to KDIS#4 maps illustrated in FIGS. 6 to 9, respectively. The KDIS#1 to KDIS#4 maps are prepared for calculating the variation correction factors KDIS#1 to KDIS#4 for the #1 to #4 cylinders 3a, and one of the KDIS#1 to KDIS#4 maps corresponding to the cylinder number #i is used for calculating the variation correction factor KDIS#i at step 11.

As illustrated in FIGS. 6 to 9, multiple maps are set as these KDIS#1 to KDIS#4 maps, each of the maps being used when the engine rotational speed NE is first to third predetermined rotational speeds NE1 to NE3 and when the intake air amount GACYL#i is first to third predetermined values GA1 to GA3 (not illustrated). The first to third predetermined rotational speeds NE1 to NE3 are set with the relation of NE1<NE2<NE3, and the first to third predetermined values GA1 to GA3 are set with the relation of GA1<GA2<GA3. Note that when an engine rotational speed NE is a speed other than the first to third predetermined rotational speeds NE1 to NE3, and when an intake air amount GACYL#i is a value other than the first to third predetermined values GA1 to GA3, the variation correction factor KDIS#i is calculated by interpolation calculation.

In the KDIS#1 to KDIS#4 maps, the variation correction factors KDIS#1 and KDIS#2 are set to positive values smaller than the value 1.0, and the correction factors KDIS#3 and KDIS#4 are set to values larger than the value 1.0. The KDIS#1 is set to a smaller value than the KDIS#2 with respect to the same valve closing timing IVC, the same engine rotational speed NE, and the same intake air amount GACYL#i. The KDIS#4 is set to a larger value than the KDIS#3 with respect to the same IVC, the same NE, and the same GACYL#i. The reason that the KDISS#1 to KDIS#4 are set as described above is as follows.

As described above, as for variations in the air/fuel ratio among the cylinders, the air/fuel ratio varies among the #1 to #4 cylinders 3a such that the following relation is satisfied: the air/fuel ratio of the #1 cylinder 3a<the air/fuel ratio of the #2 cylinder 3a<the air/fuel ratio of the #3 cylinder 3a<the air/fuel ratio of the #4 cylinder 3a. To adequately suppress the variations in the air/fuel ratio among the cylinders, corrections are made in which the fuel supplied to the #1 and #2 cylinders 3a is decreased, the fuel supplied to the #1 cylinder 3a is decreased more than that for the #2 cylinder 3a, the fuel supplied to the #3 and #4 cylinders 3a is increased, and the fuel supplied to the #4 cylinder 3a is increased more than that for the #3 cylinder 3a.

Moreover, in the KDIS#1 and KDIS#2 maps, each of the variation correction factors KDIS#1 and KDIS#2 is set to be a smaller value when the valve closing timing IVC is later (larger), which makes even higher the degree of the decrease correction by the KDIS#1 and KDIS#2. In the KDIS#3 and KDIS#4 maps, each of the variation correction factors KDIS#3 and KDIS#4 is set to be a larger value when the valve closing timing IVC is larger (later), which makes even higher the degree of the increase correction by the KDIS#3 and KDIS#4. This is because when the valve closing timing IVC becomes larger (later), a quantity of the blown-back air fuel mixture becomes larger, which makes variations in the air/fuel ratio among the cylinders even larger (differences in the air/fuel ratio become even larger among the cylinders $3a$).

Moreover, in the KDIS#1 and KDIS#2 maps, each of the variation correction factors KDIS#1 and KDIS#2 is set to be a larger value when the engine rotational speed NE is higher and when the intake air amount GACYL#i is larger, which makes even lower the degree of the decrease correction by the KDIS#1 and KDIS#2. In the KDIS#3 and KDIS#4 maps, each of the variation correction factors KDIS#3 and KDIS#4 is set to be a smaller value when the NE is higher and when the GACYL#i is larger, which makes even lower the degree of the increase correction by the KDIS#3 and KDIS#4.

This is because when the engine rotational speed NE is higher, the period in which the intake valve 9 is in a valve open state during a compression stroke is shorter and flow velocity (inertia) of the intake is higher, causing the quantity of the blown-back air fuel mixture to be smaller, which makes variations in the air/fuel ratio among the cylinders even smaller (differences in the air/fuel ratio become even smaller among the cylinders $3a$). In addition, it is also a reason that when the intake air amount GACYL#i is larger, the pressure inside the branch passage $4d$ is higher and the pressure difference between the inside of each cylinder $3a$ and the inside of the branch passage $4d$ is smaller, causing the quantity of the blown-back air fuel mixture to be even smaller, which makes variations in the air/fuel ratio among the cylinders $3a$ even smaller.

Figure 5:
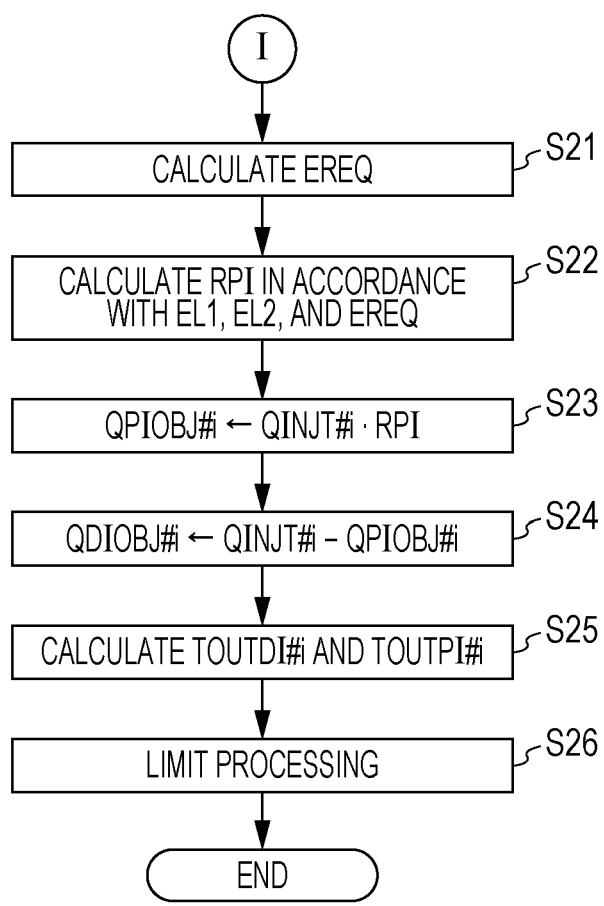
FIG. 5 is a flowchart illustrating the continuous processing after the processing in FIG. 4.
Figure 6:
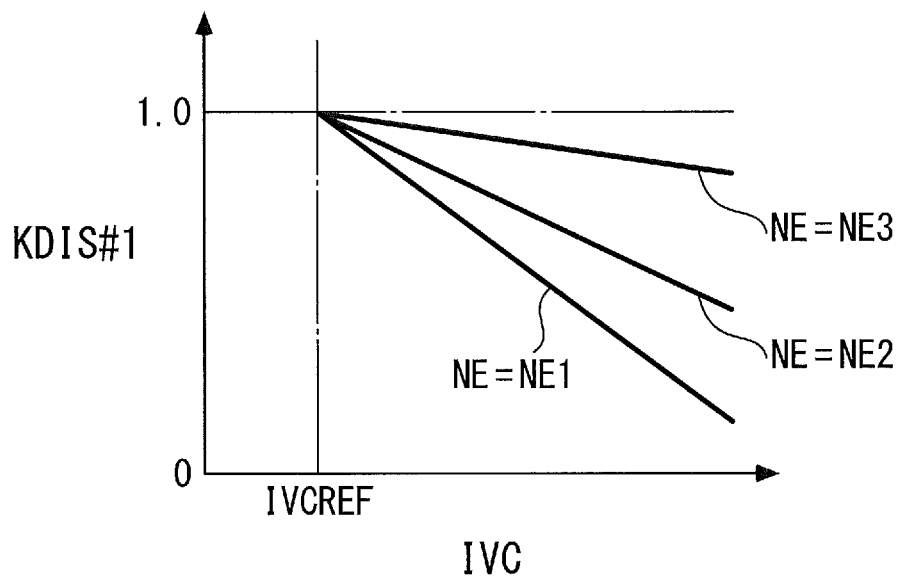
FIG. 6 is an example of a KDIS#1 map usable in the fuel injection control processing.
Figure 7:
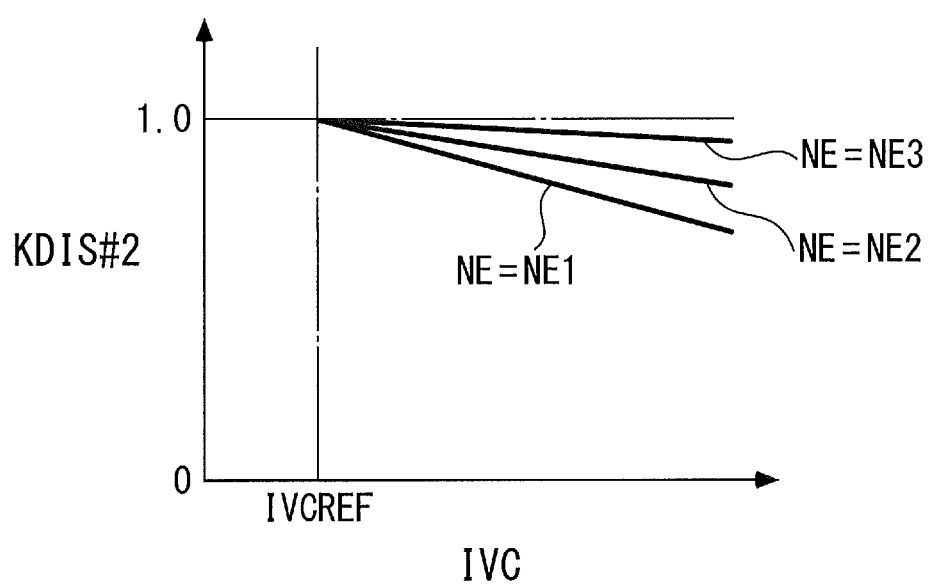
FIG. 7 is an example of a KDIS#2 map usable in the fuel injection control processing.
Figure 8:
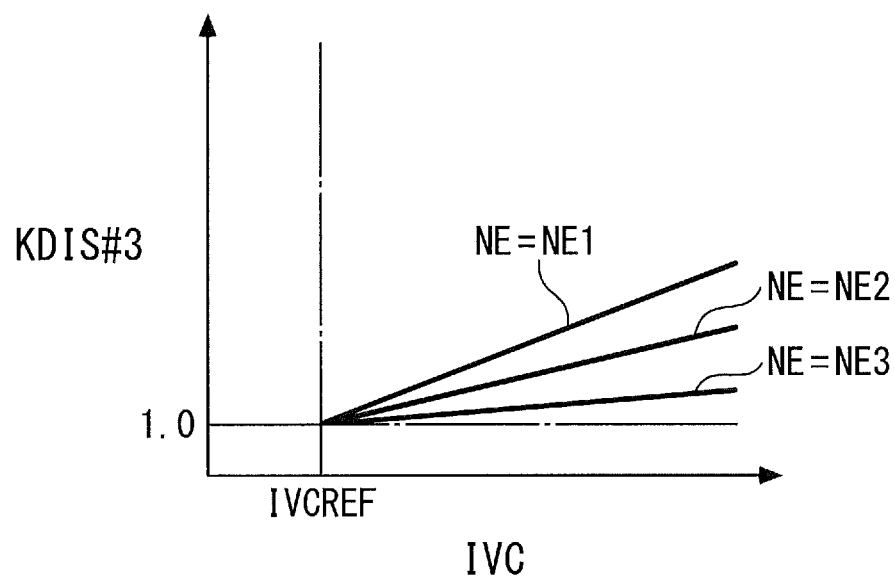
FIG. 8 is an example of a KDIS#3 map usable in the fuel injection control processing.
Figure 9:
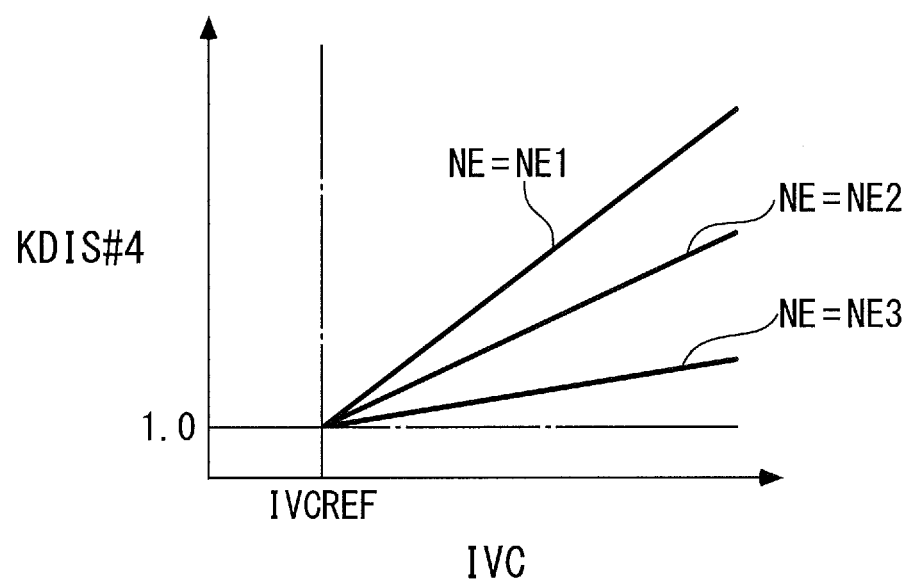
FIG. 9 is an example of a KDIS#4 map usable in the fuel injection control processing.

At step 11 following step 10, the ECU calculates the total fuel injection quantity QINJT#i by multiplying the tentative fuel injection quantity QITEM#i calculated at step 5 by the variation correction factor KDIS#i calculated in step 10. Then, step 21 in FIG. 5 is performed.

At step 21 following step 9 or 11, the ECU 2 calculates a required ethanol concentration EREQ in accordance with the engine rotational speed NE and the required torque TREQ by retrieving a predetermined map (not illustrated). This required ethanol concentration EREQ is a required value of the ethanol concentration of the fuel supplied in the combustion chamber $3d$, and is set in the above maps to be a larger value when the required torque TREQ is larger.

Subsequently, the ECU 2 calculates a port injection ratio RPI in accordance with detected first and second ethanol concentrations EL1 and EL2 and the calculated required ethanol concentration EREQ by retrieving a predetermined map (not illustrated) (step 22). This port injection ratio RPI is a ratio of a fuel injection quantity of the port injection valve 7 (hereinafter referred to as a "port injection quantity") to the sum of a fuel injection quantity of the cylinder injection valve 6 (hereinafter referred to as a "cylinder injection quantity") and the port injection quantity, and is set in the above maps such that the ethanol concentration in the fuel supplied in the combustion chamber $3d$ is equal to the required ethanol concentration EREQ.

Note that when knocking is not occurring in the engine 3, the port injection ratio RPI is decreased as a correction to hold down the consumption of the ethanol E, and when knocking occurs, the port injection ratio RPI is increased as a correction to suppress the knocking. When the required torque TREQ is lower than a predetermined threshold and the load of the engine 3 is relatively low, even though the ethanol E is not injected from the port injection valve 7, the possibility of knocking occurring in the engine 3 is considerably low. Accordingly, the port injection ratio RPI is set to the value 0. Whether or not knocking is occurring in the engine 3 is determined, for example, in accordance with a detection signal of a knock sensor (not illustrated).

At step 23 following the above step 22, the ECU 2 calculates a target port injection quantity QPIOBJ#i, which is a target value for the port injection quantity, by multiplying the total fuel injection quantity QINJT#i calculated at the above step 9 or 11 by the calculated port injection ratio RPI. Subsequently, the ECU 2 calculates a target cylinder injection quantity QDIOBJ#i, which is a target value for the cylinder injection quantity, by subtracting the calculated target port injection quantity QPIOBJ#i from the total fuel injection quantity QINJT#i (step 24).

As described above, when the required torque TREQ is lower than a threshold value TREF, the port injection ratio RPI is set to the value 0, the target port injection quantity QPIOBJ#i is therefore calculated to be the value 0, and the target cylinder injection quantity QDIOBJ#i is set as the total fuel injection quantity QINJT#i.

Subsequently, the ECU 2 calculates a final cylinder injection time TOUTDI#i and a final port injection time TOUTPI#i by converting the target cylinder injection quantity QDIOBJ#i and the target port injection quantity QPIOBJ#i calculated at the above steps 24 and 23, respectively, into time in accordance with the engine rotational speed NE (step 25). Next, the ECU 2 performs predetermined limit processing on each of the calculated final cylinder injection time TOUTDI#i and the final port injection time TOUTPI#i and terminates this processing (step 26). In this limit processing, the final cylinder injection time TOUTDI#i and the final port injection time TOUTPI#i each are limited to be smaller than or equal to their upper limits, and also limited to be larger than or equal to their lower limits.

Thus, when the final cylinder injection time TOUTDI#i and the final port injection time TOUTPI#i are calculated, control signals based on TOUTDI#i and TOUTPI#i are inputted to the cylinder injection valve 6 and the port injection valve 7, respectively, which correspond to the cylinder $3a$ having the cylinder number #i, whereby the valve opening times of the former 6 and the latter 7 are controlled to be equal to TOUTDI#i and TOUTPI#i, respectively. As a result, the cylinder injection quantity is controlled to be equal to the target cylinder injection quantity QDIOBJ#i and the port injection quantity is controlled to be equal to the target port injection quantity QPIOBJ#i. Note that the start timing for each fuel injection of the cylinder injection valve 6 and the port injection valve 7 is controlled to be equal to a target start timing calculated in accordance with the engine rotational speed NE and other parameters.

In the fuel injection control processing, as mentioned before, when NE≥NEREF (step 7: NO) or when IVC≤IVCREF (step 8: NO), a correction is not made for the total fuel injection quantity QINJT#i using the variation correction factor KDIS#i from the following reasons. When NE≥NEREF, a flow velocity of the fresh air flowing through the intake manifold $4b$ is relatively high and a quantity of the blown-back air fuel mixture is considerably small. As a result, variations in the air/fuel ratio among the cylinders hardly occur. Meanwhile, when IVC≤IVCREF, the valve closing timing of the intake valve 9 is relatively early and a quantity of the blown-back air fuel mixture is considerably small or is the value 0. As a result, variations in the air/fuel ratio among the cylinders hardly occur or do not occur at all.

Figure 10:
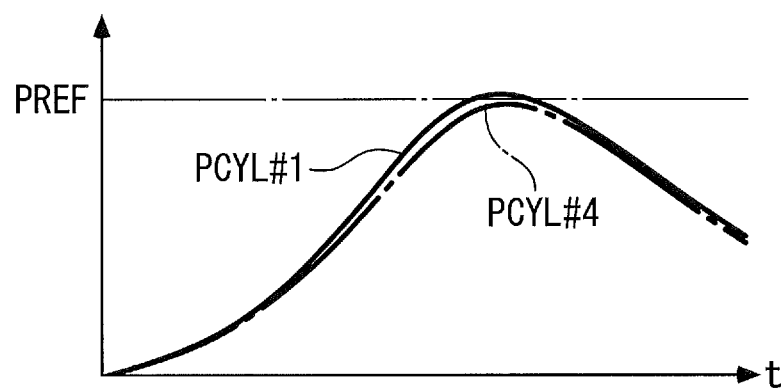
FIG. 10 is a diagram illustrating an example of changes of pressures inside a cylinder #1 and a cylinder #4 according to the embodiment.
Figure 11:
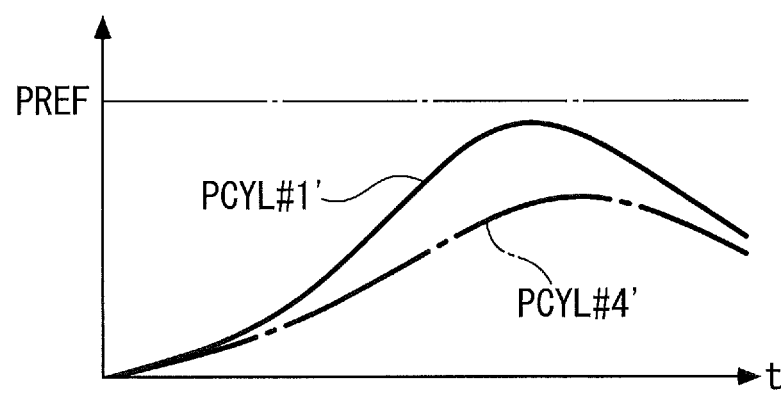
FIG. 11 is a diagram illustrating changes of pressures inside a cylinder #1 and a cylinder #4 of a comparative example.

FIG. 10 illustrates an example of changes of a pressure inside the #1 cylinder 3a (hereinafter referred to as an "in-#1-cylinder pressure PCYL#1") and a pressure inside the #4 cylinder 3a (hereinafter referred to as an "in-#4-cylinder pressure PCYL#4") of the engine 3 when the fuel injection control processing described above is performed. FIG. 11 illustrates changes of an in-#1-cylinder pressure PCYL#1' and an in-#4-cylinder pressure PCYL#4' in a comparative example. In this comparative example, differently from the fuel injection control processing, when the valve closing timing IVC is larger than the predetermined value IVCREF, the tentative fuel injection quantity QITEM#i calculated in step 5 is used as it is as a total fuel injection quantity QINJT#i without correcting the total fuel injection quantity QINJT#i using the aforementioned variation correction factor KDIS#i.

As illustrated in FIG. 10, when the fuel injection control processing is performed, the in-#1-cylinder pressure PCYL#1 and the in-#4-cylinder pressure PCYL#4 are almost equal to each other, and in other words, torques generated by the combustion in the #1 and #4 cylinders 3a are almost equal to each other. This is because variations in the air/fuel ratio among the cylinders are adequately suppressed by performing the fuel injection control processing, whereby air/fuel ratios of the air fuel mixtures burned in the #1 and #4 cylinders 3a are almost equal to each other.

In addition, the tentative fuel injection quantity QITEM#i is calculated by performing step 5 such that the detected air/fuel ratio LAF is equal to the target air/fuel ratio, and the air/fuel ratio of the air fuel mixture burned in each cylinder 3a is controlled to be equal to the target air/fuel ratio, whereby high thermal efficiency is obtained in each cylinder 3a. As a result, the maximum values of the in-#1-cylinder pressure PCYL#1 and the in-#4-cylinder pressure PCYL#4 are almost equal to a predetermined pressure PREF, which is relatively high.

In contrast, in the comparative example illustrated in FIG. 11, the in-#1-cylinder pressure PCYL#1' and the in-#4-cylinder pressure PCYL#4' are significantly different from each other. In other words, the torques generated by the combustion in the #1 and #4 cylinders 3a are significantly different from each other. The reason is as follows. Since the total fuel injection quantity QINJT#i is not corrected with the correction factor KDIS#i, variations in the air/fuel ratio among the cylinders are not adequately suppressed. As a result the air/fuel ratio of the air fuel mixture burned in the #1 cylinder 3a varies to the rich side, and the air/fuel ratio of the air fuel mixture burned in the #4 cylinder 3a varies to the lean side.

In this case, even though the tentative fuel injection quantity QITEM#i is calculated by performing step 5 based on the detected air/fuel ratio LAF detected by the air/fuel ratio sensor 33 provided at the exhaust main passage 5, since the detected air/fuel ratio LAF is a detected value on a mixture of the exhaust gases from the #1 to #4 cylinders 3a, variations in the air/fuel ratio among the cylinders cannot be adequately compensated, and the air/fuel ratio of the air fuel mixture burned in each cylinder 3a deviates from the target air/fuel ratio. As a result, in the comparative example, the thermal efficiency in each cylinder 3a falls, which makes both of the maximum values of the in-#1-cylinder pressure PCYL#1' and the in-#4-cylinder pressure PCYL#4' lower than the predetermined pressure PREF.

As heretofore described, it is understood that by performing the fuel injection control processing, variations in the air/fuel ratio among the cylinders can be adequately suppressed, which in turn makes it possible to obtain the desired power output of the engine 3.

Note that the correspondence between various elements in the present embodiment and various elements in the present disclosure is as follows. The #1 to #4 cylinders 3a in the present embodiment correspond to the a plurality of cylinders in the present disclosure, and the intake main passage 4, the intake port 4a, the intake manifold 4b, the chamber portion 4c, and the branch passage 4d correspond to the intake system in the present disclosure.

Moreover, the cylinder injection valve 6 and the port injection valve 7 in the present embodiment correspond to the fuel injection valve and also correspond to the first and second fuel injection valves in the present disclosure, respectively, and the gasoline G and the ethanol E in the present embodiment correspond to the low octane fuel and the high octane fuel in the present disclosure, respectively. Further, the ECU 2 in the present embodiment corresponds to the parameter acquiring device and the injection quantity correcting device in the present disclosure, and the crank angle sensor 31 and the air flow sensor 32 in the present embodiment correspond to the parameter acquiring device in the present disclosure.

Figure 4:
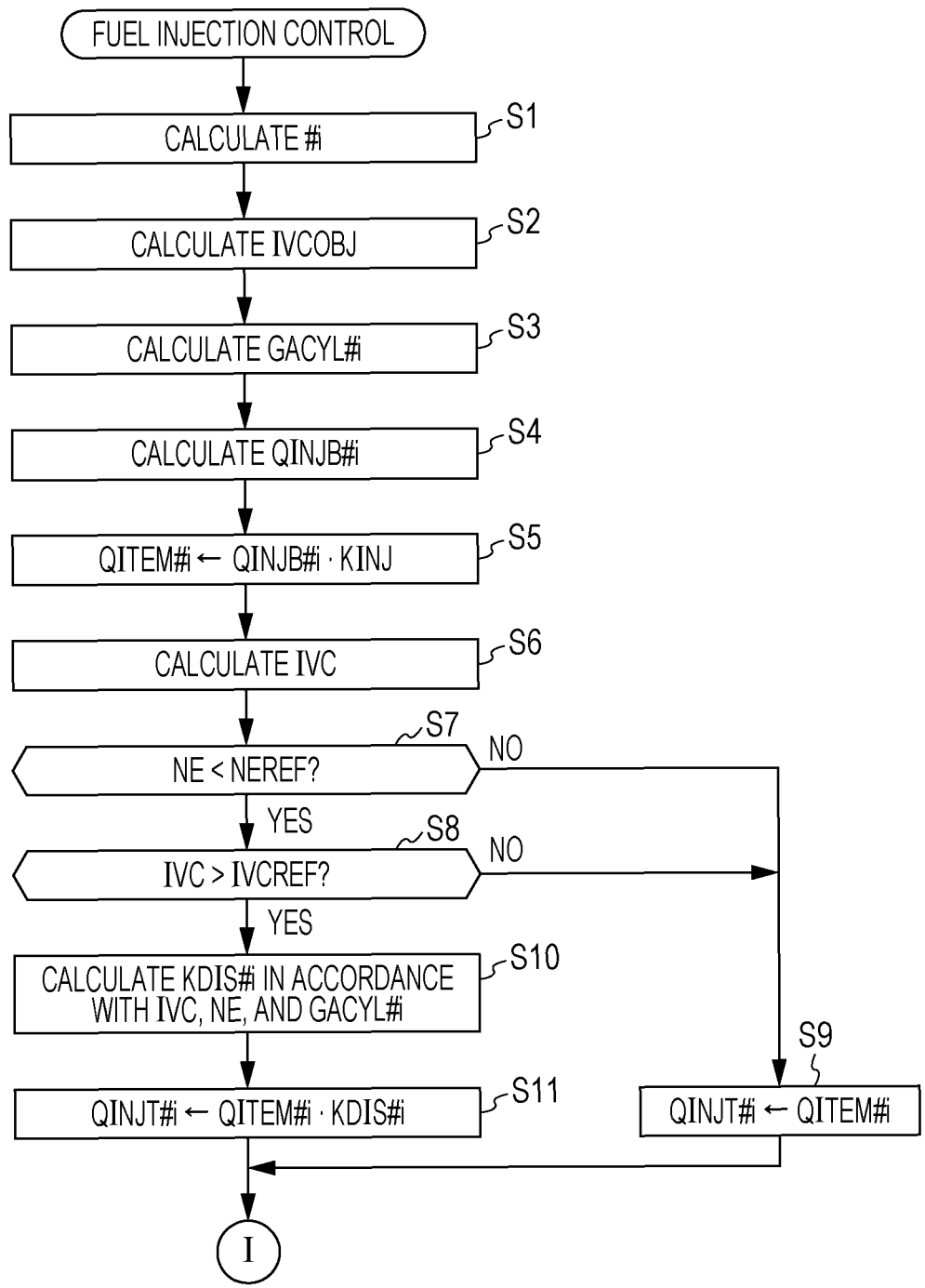
FIG. 4 is a flowchart illustrating fuel injection control processing performed by the ECU.

As stated above, according to the present embodiment, while the effective-compression-ratio reducing operation is performed (step 8 in FIG. 4: YES), the cylinder injection quantity and the port injection quantity are corrected for each cylinder 3a in accordance with the engine rotational speed NE, the valve closing timing IVC of the intake valve 9, and the intake air amount GACYL#i such that variations in the air/fuel ratio among the cylinders are suppressed (steps 10 and 11 in FIG. 4, and steps 23 to 25 in FIG. 5). Thus, variations in the air/fuel ratio among the cylinders are adequately suppressed, which in turn makes it possible to obtain the desired power output of the engine 3. Hereinafter, the cylinder injection quantity and the port injection quantity are collectively referred to as the "fuel injection quantity" as needed.

Here, since the correction described above is performed in accordance with the engine rotational speed NE, the valve closing timing IVC of the intake valve 9, and the intake air amount GACYL#i, and these parameters correlate closely with the quantity of the blown-back air fuel mixture, variations in the air/fuel ratio among the cylinders can be more adequately suppressed.

Moreover, the fuel injection quantity is controlled by performing step 5 such that the detected air/fuel ratio LAF detected is equal to the predetermined target air/fuel ratio, whereby, in combination with the suppression of variations in the air/fuel ratio among the cylinders described above, the air/fuel ratio of the air fuel mixture for each cylinder 3a is controlled appropriately to be equal to the target air/fuel ratio.

As mentioned earlier, since variations in the air/fuel ratio among the cylinders occur due to the differences in the inflow blown-back air fuel mixture ratio and the inflow fresh air ratio among the #1 to #4 cylinders 3a, the variations can be suppressed by appropriately designing the structure (length, shape, cross-sectional area, and other factors) of the intake manifold 4b or other parts. In contrast, according to the present embodiment, since variations in the air/fuel ratio among the cylinders can be adequately suppressed by the aforementioned correction of the fuel injection quantity, such designing of an intake manifold 4b and related parts is not necessary, which in turn gives the more design flexibility.

In addition, the aforementioned correction of the fuel injection quantity is performed with the variation correction factor KDIS#i. The degree of the correction becomes higher as the valve closing timing IVC becomes later, and the degree of the correction becomes lower as the engine rotational speed NE becomes higher, or as the intake air amount GACYL#i becomes larger (FIGS. 6 to 9). This makes it possible to obtain the aforementioned advantage more effectively, which is the advantage that variations in the air/fuel ratio among the cylinders can be adequately suppressed.

Moreover, the total fuel injection quantity QINJT#i, which is a target value for the total quantity of the cylinder injection quantity and the port injection quantity, is corrected with the variation correction factor KDIS#i, and from the corrected total fuel injection quantity QINJT#i, the target cylinder injection quantity QDIOBJ#i and the target port injection quantity QPIOBJ#i are calculated. As is apparent from this description, since the degree of the correction of the cylinder injection quantity and the degree of the correction of the port injection quantity each using the variation correction factor KDIS#i are uniformly set, it is possible to obtain the aforesaid advantage more effectively in the engine 3 provided with the cylinder injection valve 6 and the port injection valve 7. In addition, the fuel injections of the gasoline G and the ethanol E are not corrected in a way where the degrees of the corrections are different from each other, which prevents variations in the octane number which would occur by such corrections.

Note that the present disclosure is not limited to the embodiment described above, and can be implemented in various modes. For example, although, in the embodiment, the fuel injection quantity (the cylinder injection quantity and the port injection quantity) is corrected in accordance with the engine rotational speed NE, the valve closing timing IVC, and the intake air amount GACYL#i, this correction may be made in accordance with one or two of these parameters. In addition, although, in the embodiment, the intake air amount GACYL#i is used as the intake parameter of the present disclosure, another appropriate parameter indicating the amount of the fresh air flowing through the intake system may be used, for example, a pressure inside the intake system including the intake main passage 4 and the intake manifold 4b may be used.

Moreover, although, in the embodiment, the cylinder injection quantity and the port injection quantity are corrected with the variation correction factor KDIS#i, which is a correction multiplication term, the correction may be made with a correction addition term or a correction subtraction term. Moreover, although, in the embodiment, the total fuel injection quantity QINJT#i, which is a target value for the total quantity of the cylinder injection quantity and the port injection quantity, is corrected, the target cylinder injection quantity QDIOBJ#i and the target port injection quantity QPIOBJ#i may be calculated, and the calculated QDIOBJ#i and QPIOBJ#i may be uniformly corrected, instead of correcting the total fuel injection quantity QINJT#i.

Furthermore, although, in the embodiment, the number of the cylinders 3a is four, the number may be any plural numbers besides four. In any of these cases, the air/fuel ratio of the air fuel mixture burned in a cylinder farther from the intake main passage connected the converging portion of the intake manifold of the intake system is richer, and the air/fuel ratio tends to vary among the multiple cylinders. To suppress variations in the air/fuel ratio, the fuel injection quantity may be corrected for each cylinder following the tendencies of the variation correction factor KDIS#i described with reference to FIGS. 6 to 9.

Moreover, although, in the embodiment, the gasoline G as the low octane fuel of the present disclosure is injected from the cylinder injection valve 6 and the ethanol E as the high octane fuel of the present disclosure is injected from the port injection valve 7, the low octane fuel may be injected from a port injection valve, and the high octane fuel may be injected from a cylinder injection valve, conversely. Furthermore, although the embodiment is an example in which the fuel injection control apparatus 1 of the present disclosure is used for the engine 3 provided with both the cylinder injection valve 6 and the port injection valve 7, the fuel injection control apparatus 1 may be applied to an internal combustion engine provided with one of the two injection valves. Moreover, although, in the embodiment, the engine 3 is a gasoline engine, it may be a diesel engine or an LPG engine. Variations of the embodiment described above may naturally be combined as necessary. In addition, the detail of the configuration may be modified as necessary within the scope of the present disclosure.

In a first aspect of the disclosure, a fuel injection control apparatus 1 of an internal combustion engine 3 including a plurality of cylinders (#1 to #4 cylinders 3a in an embodiment (the same applies in this section)), a fuel injection valve (a cylinder injection valve 6 and a port injection valve 7), and an intake valve 9, the fuel injection valve and the intake valve 9 being provided to each of the cylinders, in which an effective-compression-ratio reducing operation is performed to reduce an effective-compression-ratio by setting a valve closing timing of the intake valve 9 at a timing within a compression stroke. The fuel injection control apparatus 1 includes: a parameter acquiring device (a crank angle sensor 31, an air flow sensor 32, and an ECU 2) which acquires a correction parameter including at least one of a rotational speed of the internal combustion engine 3, the valve closing timing of the intake valve 9, and an intake parameter indicating an intake air amount which is an amount of fresh air flowing through an intake system (an intake main passage 4, an intake port 4a, an intake manifold 4b, a chamber portion 4c, and branch passages 4d) of the internal combustion engine 3; and an injection quantity correcting device (the ECU 2, steps 10 and 11 in FIG. 4, steps 23 to 25 in FIG. 5, and FIGS. 6 to 9) which, while the effective-compression-ratio reducing operation is performed (step 8 in FIG. 4: YES), makes a correction on a fuel injection quantity of the fuel injection valve for each cylinder in accordance with the acquired correction parameter (an engine rotational speed NE, a valve closing timing IVC, and an intake air amount GACYL#i) to suppress variations in an air/fuel ratio of air fuel mixture among the cylinders, the variations being caused by the air fuel mixture which is blown back to the intake system from a cylinder in a compression stroke among the cylinders and flows into another cylinder in an intake stroke.

With this configuration, the correction parameter including at least one of the rotational speed of the internal combustion engine, the valve closing timing of the intake valve, and the intake air amount which is an amount of the fresh air flowing through the intake system is acquired by the parameter acquiring device. While the effective-compression-ratio reducing operation is performed, the fuel injection quantity of the fuel injection valve is corrected by the injection quantity correcting device for each cylinder in accordance with the acquired correction parameter to suppress variations in the air/fuel ratio of the air fuel mixture among the multiple cylinders, the variations being caused by the air fuel mixture which is blown back to the intake system from a cylinder in a compression stroke among the cylinders to the intake system (hereinafter referred to as the "blown-back air fuel mixture") and flows into another cylinder in an intake stroke. Thus, such variations in the air/fuel ratio among the multiple cylinders (hereinafter referred to as the "variations in the air/fuel ratio among the cylinders") can be adequately suppressed, which in turn makes it possible to obtain a desired power output of the internal combustion engine.

Here, the aforementioned correction of the fuel injection quantity is performed by the injection quantity correcting device in accordance with the correction parameter including at least one of the rotational speed of the internal combustion engine, the valve closing timing of the intake valves, and the intake air amount. Since these parameters correlate closely with the quantity of the blown-back air fuel mixture, the aforementioned variations in the air/fuel ratio among the cylinders can be more adequately suppressed based on such correction parameter.

Since variations in the air/fuel ratio among the cylinders occur due to differences in the ratio of the blown-back air fuel mixture flowing in and in the ratio of the fresh air among the multiple cylinders as described above, the variations can be suppressed by appropriately designing the structure (length, shape, cross-sectional area, and other factors) of the intake system. According to the present disclosure, since the variations in the air/fuel ratio among the cylinders can be adequately suppressed by the aforementioned correction of the fuel injection quantity, such designing of an intake system is not necessary, which in turn gives the more design flexibility.

According to a second aspect of the disclosure, in the fuel injection control apparatus 1 of the internal combustion engine 3 described in the first aspect, the correction parameter may include the rotational speed of the internal combustion engine 3, and a degree of the correction of the fuel injection quantity by the injection quantity correcting device preferably becomes lower as the rotational speed of the internal combustion engine 3 becomes higher (FIGS. 6 to 9).

While the effective-compression-ratio reducing operation is performed, as the rotational speed of the internal combustion engine becomes higher, the period in which the intake valve is in a valve open state during a compression stroke of the internal combustion engine becomes shorter, and thus a quantity of blown-back air fuel mixture (the air fuel mixture blown back from a cylinder in a compression stroke) tends to become even smaller. Moreover, as the rotational speed of the internal combustion engine becomes higher, the flow velocity (inertia) of the intake becomes higher, and thus the quantity of the blown-back air fuel mixture also tends to become smaller.

With the configuration described above, while the effective-compression-ratio reducing operation is performed, as the rotational speed of the internal combustion engine becomes higher, a degree of the correction of the fuel injection quantity by the injection quantity correcting device becomes lower. Since this makes it possible to correct the fuel injection quantity adequately, corresponding to the aforementioned tendency in a quantity of the blown-back air fuel mixture in accordance with the rotational speed of the internal combustion engine, it is possible to obtain the aforementioned advantage according to the first aspect effectively, which is the advantage that variations in the air/fuel ratio among the cylinders are adequately suppressed.

According to a third aspect of the disclosure, in the fuel injection control apparatus 1 of the internal combustion engine 3 described in the first or second aspect, the correction parameter may include the valve closing timing of the intake valve 9, and a degree of the correction of the fuel injection quantity by the injection quantity correcting device preferably becomes higher as the valve closing timing of the intake valve 9 becomes later (FIGS. 6 to 9).

While the effective-compression-ratio reducing operation is performed, as the valve closing timing of the intake valve becomes later, a valve opening period of the intake valve during a compression stroke becomes longer, and thus a quantity of the blown-back air fuel mixture tends to become larger. With the configuration described above, however, as the valve closing timing of the intake valve becomes later, a degree of the correction of the fuel injection quantity by the injection quantity correcting device becomes higher. Since this makes it possible to correct the fuel injection quantity adequately, corresponding to the aforementioned tendency in a quantity of the blown-back air fuel mixture in accordance with the valve opening period of the intake valve during the compression stroke, it is possible to obtain the aforementioned advantage according to the first aspect effectively, which is the advantage that variations in the air/fuel ratio among the cylinders are adequately suppressed.

According to a fourth aspect of the disclosure, in the fuel injection control apparatus 1 of the internal combustion engine 3 described in any one of the first to third aspects, the correction parameter may include the intake parameter, and a degree of the correction of the fuel injection quantity by the injection quantity correcting device preferably becomes lower as the intake air amount indicated by the intake parameter becomes larger (FIGS. 6 to 9).

While the effective-compression-ratio reducing operation is performed, as the intake air amount becomes larger, a pressure inside the intake system becomes higher, and the difference between a pressure inside the intake system and a pressure inside the cylinder becomes smaller, and thus a quantity of the blown-back air fuel mixture tends to become even smaller. With the above configuration, as the intake air amount becomes larger, a degree of the correction of the fuel injection quantity by the injection quantity correcting device becomes lower. Since this makes it possible to correct the fuel injection quantity adequately, corresponding to the aforementioned tendency in a quantity of the blown-back air fuel mixture in accordance with the intake air amount, it is possible to obtain the aforementioned advantage according to the first aspect effectively, which is the advantage that variations in the air/fuel ratio among the cylinders are adequately suppressed.

According to a fifth aspect of the disclosure, in the fuel injection control apparatus 1 of the internal combustion engine 3 described in any one of the first to fourth aspects, the internal combustion engine 3 may include, as the fuel injection valve, a first fuel injection valve (a cylinder injection valve 6) which injects low octane fuel and a second fuel injection valve (a port injection valve 7) which injects high octane fuel having an octane number higher than that of the low octane fuel, and a degree of the correction of the fuel injection quantity by the injection quantity correcting device may be set uniformly between the first and second fuel injection valves (steps 10 and 11 in FIG. 4, steps 23 to 25 in FIG. 5, and FIGS. 6 to 9).

With this configuration, while the effective-compression-ratio reducing operation is performed, a degree of the correction of the fuel injection quantity by the injection quantity correcting device described above is set uniformly between the first and second fuel injection valves. Thus, in the internal combustion engine provided with the both fuel injection valves, it is possible to obtain effectively the advantage that variations in the air/fuel ratio among the cylinders are adequately suppressed. In addition, since the fuel injections of the low octane fuel and the high octane fuel are not corrected in a way the degrees of the corrections are different from each other, which prevents variations in the octane number which would occur by such corrections.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel injection control apparatus of an internal combustion engine including a plurality of cylinders, a fuel injection valve and an intake valve, the fuel injection valve and the intake valve being provided to each of the cylinders, in which an effective-compression-ratio reducing operation is performed to reduce an effective-compression-ratio by setting a valve closing timing of the intake valve at a timing within a compression stroke, the fuel injection control apparatus comprising:
   a parameter acquiring device which acquires a correction parameter including at least one of a rotational speed of the internal combustion engine, the valve closing timing of the intake valve, and an intake parameter indicating an intake air amount which is an amount of fresh air flowing through an intake system of the internal combustion engine; and
   an injection quantity correcting device which, while the effective-compression-ratio reducing operation is performed, makes a correction on a fuel injection quantity of the fuel injection valve for each cylinder in accordance with the acquired correction parameter to suppress variations in an air/fuel ratio of air fuel mixture among the cylinders, the variations being caused by the air fuel mixture which is blown back to the intake system from a cylinder in a compression stroke among the cylinders and flows into another cylinder in an intake stroke, wherein
   the internal combustion engine includes, as the fuel injection valve, a first fuel injection valve which injects low octane fuel and a second fuel injection valve which injects high octane fuel having an octane number higher than that of the low octane fuel, and
   a degree of the correction of the fuel injection quantity by the injection quantity correcting device is set uniformly between the first and second fuel injection valves.

2. The fuel injection control apparatus of the internal combustion engine according to claim 1, wherein
   the correction parameter includes the rotational speed of the internal combustion engine, and
   a degree of the correction of the fuel injection quantity by the injection quantity correcting device becomes lower as the rotational speed of the internal combustion engine becomes higher.

3. The fuel injection control apparatus of the internal combustion engine according to claim 1, wherein
   the correction parameter includes the valve closing timing of the intake valve, and
   a degree of the correction of the fuel injection quantity by the injection quantity correcting device becomes higher as the valve closing timing of the intake valve becomes later.

4. The fuel injection control apparatus of the internal combustion engine according to claim 1, wherein
   the correction parameter includes the intake parameter, and
   a degree of the correction of the fuel injection quantity by the injection quantity correcting device becomes lower as the intake air amount indicated by the intake parameter becomes larger.

5. The fuel injection control apparatus of the internal combustion engine according to claim 1, wherein
   the first fuel injection valve is a cylinder injection valve and the second fuel injection valve is a port injection valve.

6. The fuel injection control apparatus of the internal combustion engine according to claim 1, wherein
   the first fuel injection valve is a port injection valve and the second fuel injection valve is a cylinder injection valve.

7. A fuel injection control apparatus for an internal combustion engine having cylinders each of which includes a fuel injection valve and an intake valve, comprising:
   an intake valve controller to perform an effective-compression-ratio reducing operation in which a valve closing timing of the intake valve is controlled to be at a timing in a compression stroke to reduce an effective-compression-ratio;
   a parameter acquiring device to acquire a correction parameter including at least one of a rotational speed of the internal combustion engine, the valve closing timing of the intake valve, and an intake parameter indicating an intake fresh air amount flowing into the cylinders through an intake system; and
   an injection quantity correcting device to correct a fuel injection quantity for the fuel injection valve in accordance with the acquired correction parameter to suppress variations among air/fuel ratios of air fuel mixtures in the cylinders while the intake valve controller performs the effective-compression-ratio reducing operation, wherein
   the internal combustion engine includes, as the fuel injection valve, a first fuel injection valve which injects low octane fuel and a second fuel injection valve which injects high octane fuel having an octane number higher than that of the low octane fuel, and
   a degree of the correction of the fuel injection quantity by the injection quantity correcting device is set uniformly between the first and second fuel injection valves.

8. The fuel injection control apparatus according to claim 7, wherein
   the correction parameter includes the rotational speed of the internal combustion engine, and
   a degree of the correction of the fuel injection quantity by the injection quantity correcting device becomes lower as the rotational speed of the internal combustion engine becomes higher.

9. The fuel injection control apparatus according to claim 7, wherein
   the correction parameter includes the valve closing timing of the intake valve, and
   a degree of the correction of the fuel injection quantity by the injection quantity correcting device becomes higher as the valve closing timing of the intake valve becomes later.

10. The fuel injection control apparatus according to claim 7, wherein
   the correction parameter includes the intake parameter, and a degree of the correction of the fuel injection quantity by the injection quantity correcting device becomes lower as the intake fresh air amount indicated by the intake parameter becomes larger.

11. The fuel injection control apparatus according to claim 7, wherein
the variations are caused by the air fuel mixtures which are blown back to the intake system from a cylinder in the compression stroke among the cylinders and flow into another cylinder in an intake stroke among the cylinders.

12. The fuel injection control apparatus according to claim 7, wherein
the first fuel injection valve is a cylinder injection valve and the second fuel injection valve is a port injection valve.

13. The fuel injection control apparatus according to claim 7, wherein
the first fuel injection valve is a port injection valve and the second fuel injection valve is a cylinder injection valve.

* * * * *